(12) United States Patent
Boland

(10) Patent No.: US 9,079,568 B2
(45) Date of Patent: Jul. 14, 2015

(54) WINDSCREEN WIPER DEVICE COMPRISING AN ELASTIC, ELONGATED CARRIER ELEMENT, AS WELL AS AN ELONGATED WIPER BLADE OF A FLEXIBLE MATERIAL, WHICH CAN BE PLACED IN A BUTMENT WITH THE WINDSCREEN TO BE WIPED

(75) Inventor: Xavier Boland, Arlon (BE)

(73) Assignee: Federal-Mogul S.A., Aubange (BE)

( * ) Notice: Subject to any disclaimer, the term of this patent is extended or adjusted under 35 U.S.C. 154(b) by 939 days.

(21) Appl. No.: 12/935,055

(22) PCT Filed: Mar. 23, 2009

(86) PCT No.: PCT/EP2009/053350
§ 371 (c)(1),
(2), (4) Date: Sep. 28, 2010

(87) PCT Pub. No.: WO2009/118279
PCT Pub. Date: Oct. 1, 2009

(65) Prior Publication Data
US 2011/0023254 A1    Feb. 3, 2011

(30) Foreign Application Priority Data
Mar. 28, 2008   (EP) .................................... 08103124

(51) Int. Cl.
*B60S 1/38*   (2006.01)

(52) U.S. Cl.
CPC ........ *B60S 1/3848* (2013.01); *B60S 2001/3836* (2013.01)

(58) Field of Classification Search
CPC ....................... B60S 1/3848; B60S 2001/3836
USPC ................... 15/250.361, 250.41, 250.48, 245
See application file for complete search history.

(56) References Cited

U.S. PATENT DOCUMENTS

| 3,414,930 | A |   | 12/1968 | Mitsuru |
| 4,317,251 | A | * | 3/1982 | Priesemuth ................ 15/250.41 |
| 5,044,042 | A | * | 9/1991 | Stratton ...................... 15/250.41 |
| 5,412,834 | A | * | 5/1995 | Burkard et al. .......... 15/250.452 |
| 5,513,414 | A | * | 5/1996 | Abbott et al. ............ 15/250.454 |

(Continued)

FOREIGN PATENT DOCUMENTS

| DE | 102004050163 A1 |   | 4/2006 |   |
| FR | 2867738 A |   | 9/2005 |   |
| JP | 09193750 A | * | 7/1997 | ................ B60S 1/38 |

*Primary Examiner* — Monica Carter
*Assistant Examiner* — Michael Jennings
(74) *Attorney, Agent, or Firm* — Robert L. Stearns; Dickinson Wright, PLLC

(57) ABSTRACT

A windscreen wiper device comprising carrier element, as well as wiper blade, including at least one longitudinal groove, in which groove a longitudinal strip of the carrier element is disposed, the windscreen wiper device comprises a connecting device for an oscillating arm, wherein the wiper blade comprises an elongated upper holding part and an elongated lower wiping part of a flexible material, wherein the holding part holds the longitudinal strip, wherein the wiping part comprises a wiping lip, and wherein the holding part and the wiping part are interconnected by means of a tilting web, with the special feature that a noise dampening profile is provided in slits formed between said holding part, the wiping part and the tilting web, wherein a width of the noise dampening profile extending in a direction transverse to the longitudinal direction of the wiper blade varies along the longitudinal direction.

10 Claims, 4 Drawing Sheets

(56) References Cited

U.S. PATENT DOCUMENTS

| | | | |
|---|---|---|---|
| 6,163,922 A * | 12/2000 | Fisher et al. | 15/250.48 |
| 6,233,779 B1 * | 5/2001 | Nelson, Sr. | 15/250.41 |
| 6,314,608 B1 * | 11/2001 | Fisher et al. | 15/250.451 |
| 6,647,583 B1 * | 11/2003 | Wynen et al. | 15/250.48 |
| 6,665,904 B1 * | 12/2003 | Kerchaert | 15/250.41 |
| 6,665,905 B2 * | 12/2003 | Wegner et al. | 15/250.48 |
| 7,555,806 B1 * | 7/2009 | James | 15/250.41 |
| 7,810,206 B2 * | 10/2010 | Weiler et al. | 15/250.201 |
| 7,836,542 B2 * | 11/2010 | Dietrich et al. | 15/250.43 |
| 7,845,044 B2 * | 12/2010 | Park | 15/250.43 |
| 2002/0053113 A1 * | 5/2002 | Boland et al. | 15/250.48 |
| 2006/0107485 A1 * | 5/2006 | Kim | 15/250.201 |
| 2008/0178409 A1 * | 7/2008 | Dietrich et al. | 15/250.48 |
| 2008/0313843 A1 * | 12/2008 | Chou | 15/250.48 |
| 2009/0106928 A1 * | 4/2009 | Lee | 15/250.361 |
| 2009/0241282 A1 * | 10/2009 | Marc | 15/250.48 |

\* cited by examiner

WINDSCREEN WIPER DEVICE COMPRISING AN ELASTIC, ELONGATED CARRIER ELEMENT, AS WELL AS AN ELONGATED WIPER BLADE OF A FLEXIBLE MATERIAL, WHICH CAN BE PLACED IN A BUTMENT WITH THE WINDSCREEN TO BE WIPED

BACKGROUND OF THE INVENTION

1. Technical Field

The invention relates to a windscreen wiper device comprising an elastic, elongated carrier element, as well as an elongated wiper blade, which can be placed in abutment with a windscreen to be wiped, which wiper blade includes at least one longitudinal groove, in which groove a longitudinal strip of the carrier element is disposed, wherein ends of the longitudinal strip are connected to a respective connecting piece, which windscreen wiper device comprises a connecting device for an oscillating arm, wherein the wiper blade comprises an elongated upper holding part and an elongated lower wiping part of a flexible material, wherein the holding part holds the longitudinal strip, wherein the wiping part comprises a wiping lip, and wherein the holding part and the wiping part are interconnected by means of a tilting web.

2. Related Art

Such a windscreen wiper device is generally known. The prior art windscreen wiper device is in particular designed as a "yokeless" wiper device or "flat blade", wherein use is no longer made of several yokes pivotally connected to each other, but wherein the wiper blade is biased by the carrier element, as a result of which it exhibits a specific curvature. The holding part, the wiping part and the tilting web of the known windscreen wiper device are made in one piece.

A disadvantage of the known windscreen wiper device is the following. In practice the oscillating arm is connected to a mounting head fixed for rotation to a shaft driven by a small motor. In use, the shaft rotates alternately in a clockwise and in a counter-clockwise sense carrying the mounting head into rotation also, which in turn draws the oscillating arm into rotation and by means of the connecting device moves the wiper blade. The tilting web acts as an intermediate part subjected to a force in accordance with the wiping direction. the force acts solely on the tilting web, so that the wiping lip attached to the wiping part is guided in opposite direction to the wiping direction. Particularly, the tilting web is strip-shaped, whereas the wiping lip is triangular in shape. However, the oscillatory movement of the wiping lip along the windscreen to be wiped results in a significant "rattling" noise or reversal noise, particularly as a consequence of the wiping lip being tumbled over at each turning point of its oscillatory movement.

SUMMARY OF THE INVENTION AND ADVANTAGES

It is an object of the invention to improve the prior art, that is to provide a windscreen wiper device wherein the above disadvantage is obviated at minimum costs.

It is noted that the present invention is not restricted to windscreen wiper devices for cars, but that it also relates to windscreen wiper devices for rail coaches and all other (fast) vehicles.

In order to accomplish that objective, a windscreen wiper device of the kind referred to in the introduction according to the invention is characterized in that a noise dampening profile is provided in slits formed between the holding part, the wiping part and the tilting web, wherein a width of the noise dampening profile extending in a direction transverse to the longitudinal direction of the wiper blade varies along the longitudinal direction. Particularly, the width at the location of the connecting device is larger than the width at the location of the connecting pieces. The present invention is particularly based on the awareness that variation of the width of the noise dampening profile may compensate the variation of the pressure as excerted on the wiper blade by the oscillating arm. Dependent on the actual construction of the present windscreen wiper device, the pressure may be larger at the location of the connection of the oscillating arm onto the wiper blade (that is at the location of the connecting device), all compared to the pressure at the ends of the longitudinal strip (that is at the location of the respective connecting pieces). By varying the width of the noise dampening profile in accordance with the normal variation in pressure excerted on the wiper blade, the actual pressure excerted on the wiper blade by the oscillating arm is more or less constant, seen along the length of the wiper blade, resulting in less noise.

In one preferred embodiment of a windscreen wiper device according to the invention, the width gradually decreases from the location of the connecting device to the location of the connecting pieces.

In another preferred embodiment of a windscreen wiper device in accordance with the invention, the noise dampening profile in each slit is formed by spaced-apart protrusions extending outwardly from the tilting web. Preferably, the protrusions extend outwardly from the tilting web to the middle of each slit. Experiments have shown that the noise caused by the wiping lip being swung over at each turning point of its oscillatory movement, is then minimal.

In another preferred embodiment of a windscreen wiper device according to the invention, the protrusions on opposite sides of the tilting web are located opposite one another in the slits. In the alternative, the protrusions are located on opposite sides of the tilting web in a staggered manner in the slits.

In another preferred embodiment of a windscreen wiper device in accordance with the invention, the width of the protrusions at the location of the connecting device is chosen within the range of 0.7 mm and 2.2 mm. Preferably, the width of the protrusions at the location of the connecting pieces is chosen within the range of 0.1 mm and 1.2 mm.

In another preferred embodiment of a windscreen wiper device according to the invention, the tilting web and the noise dampening profile are made in one piece. Particularly, the wiper blade is made in one piece of elastomer material, that is that the holding part, the wiping part, the tilting web and the noise dampening profile are integral.

THE DRAWINGS

The invention will now be explained in more detail with reference to figures illustrated in a drawing, wherein:

FIG. 2a is a cross-sectional view of a wiper blade as used in the windscreen wiper device of FIG. 1, while FIG. 2b is a longitudinal view along the lines A, B, C, D, E, F of FIG. 2a;

Figure 2:
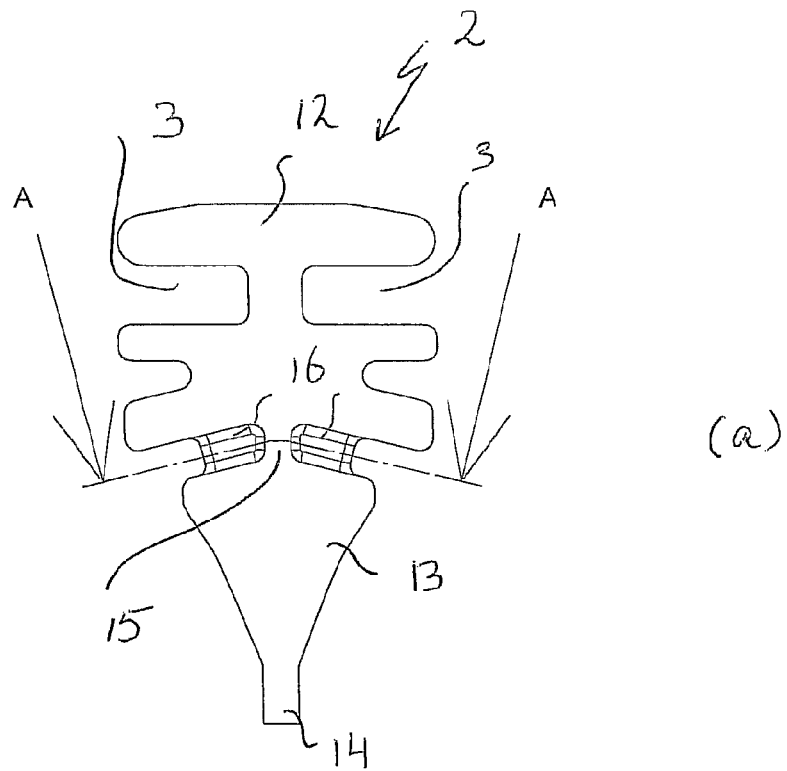
Figure 2:
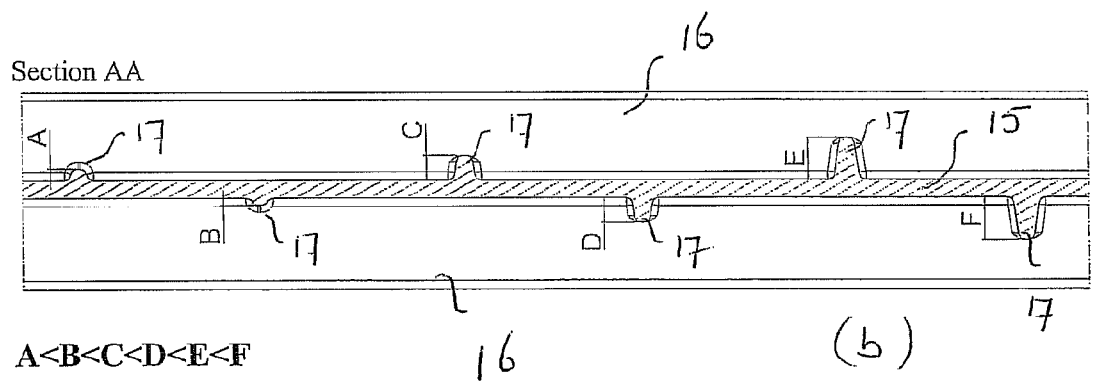
Figure 3:
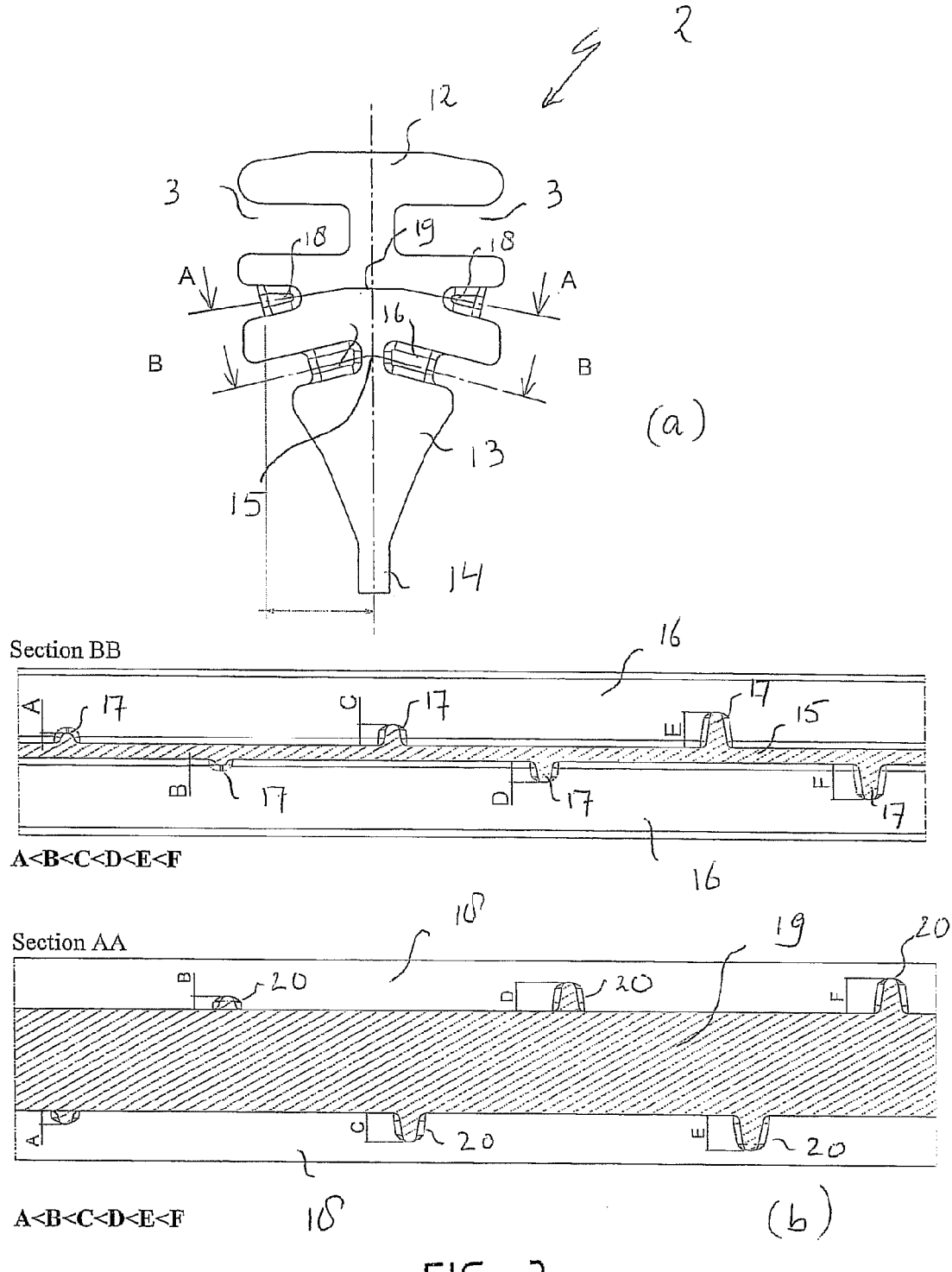
Figure 4:
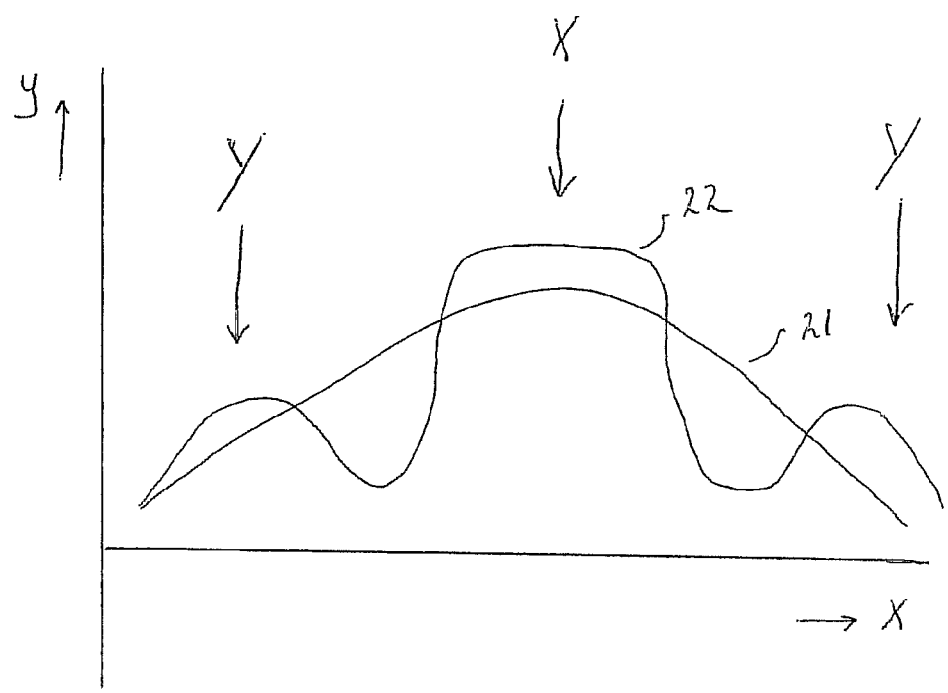

FIG. 3 corresponds to FIG. 2, but now referring to another preferred embodiment; and FIG. 4 shows a relationship between the width of a noise dampening profile measured along the y-axis and the length of a wiper blade along the x-axis according to the invention.

DETAILED DESCRIPTION

Figure 1:
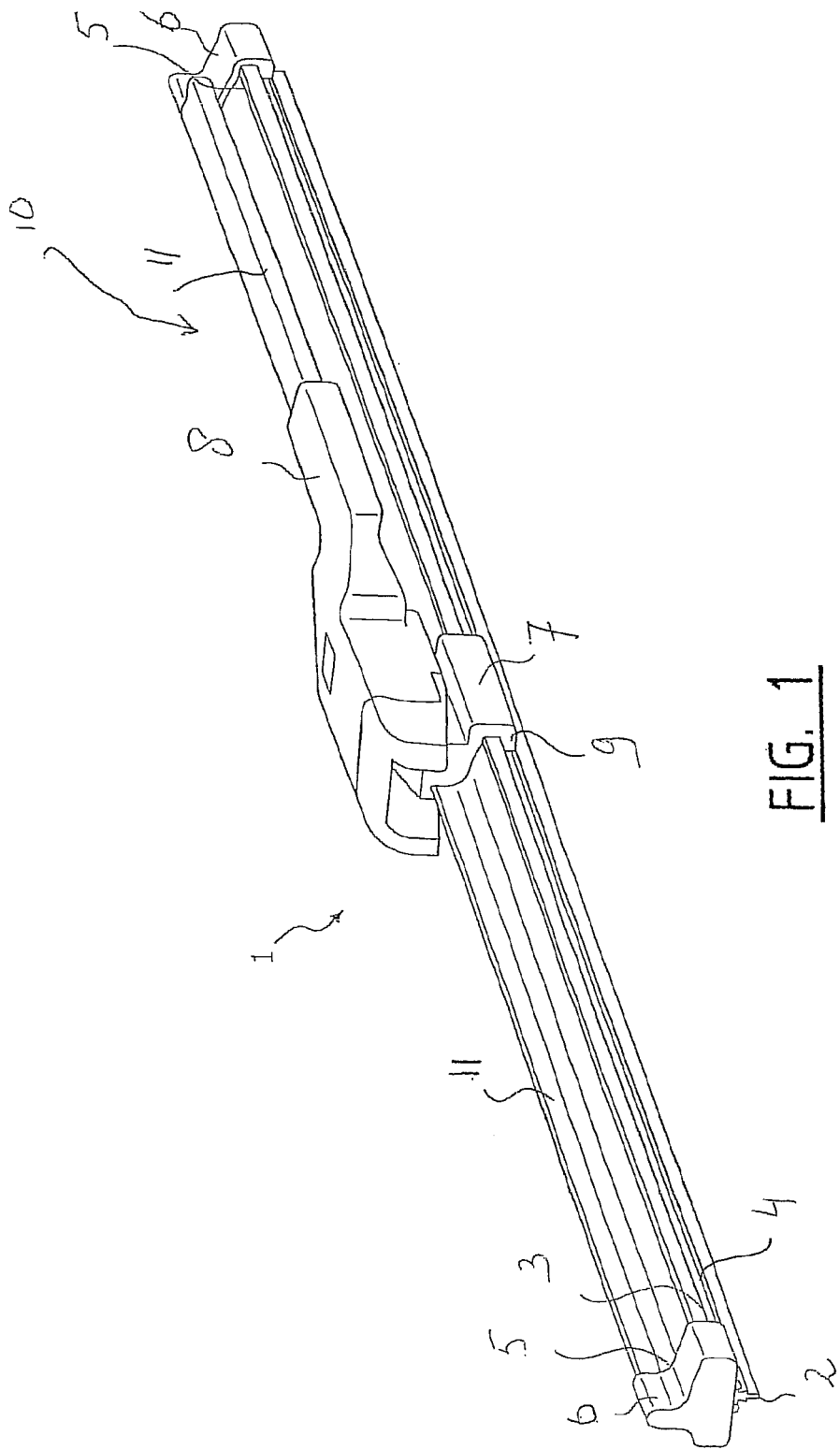
FIG. 1 is a total perspective, schematic view of a windscreen wiper device according to the invention.

FIG. 1 shows a preferred variant of a windscreen wiper device 1 according to the invention. The windscreen wiper device is built up of an elastomeric wiper blade 2, in the longitudinal sides of which opposing longitudinal grooves 3 are formed, and of longitudinal strips 4 made of spring band steel, which are fitted in the longitudinal grooves 3. The strips 4 form a flexible carrier element for the rubber wiper blade 2, as it were, which is thus biased in a curved position (the curvature in operative position being that of a windscreen to be wiped). Neighboring ends 5 of strips 4 are interconnected on either side of the windscreen wiper device 1 by means of connecting pieces 6 functioning as clamping members. In this embodiment, the connecting pieces 6 are separate constructional elements, which may be form-locked as well as force-locked to the ends 5 of strips 4. In another preferred variant, the connecting pieces 6 are in one piece with the strips 4 made of spring band steel. In the latter case the connecting pieces form transverse bridges for the strips 4, as it were. The windscreen wiper device 1 is furthermore built up of a connecting device 7 of plastic or metallic material for an oscillating wiper arm 8. Connecting device 7 comprises clamping members 9 that are integral therewith, which engage A round longitudinal sides of the strips 4 that face away from each other, as a result of which the connecting device 7 is firmly attached to the unit consisting of wiper blade 2 and strips 4. The oscillating wiper arm 8 is pivotally connected to the connecting device 7 about a pivot axis near one end. The preferred embodiment of FIG. 5 according to the invention comprises a spoiler or "air deflector" 10 including two separate sub-spoilers 11. Each sub-spoiler 11 is detachably connected in its entirety to the wiper blade 2 on opposite sides of the connecting device 7.

In FIG. 2a a cross-sectional view of the wiper blade of FIG. 1 is shown, wherein corresponding parts have been designated with the same reference numerals. As can be seen from FIG. 2a, the rubber wiper blade 2 consists of an elongated upper holding part 12 holding the longitudinal strips 4 in the grooves 3 formed therein, an elongated lower wiping part 13 having a wiping lip 14, as well as an intermediate "strip-like" titling web 15 interconnecting the holding part 12 and the wiping part 13. Again, the holding part 12, the wiping part 13 and the tilting web 15 are in one piece of rubber. The tilting web 15 defines slits or grooves 16 on opposite sides thereof.

Although not shown in FIGS. 1 and 2, but fully understood by a skilled person, the oscillating arm 8 is connected to a mounting head fixed for rotation to a shaft driven by a small motor. In use, the shaft rotates alternately in a clockwise and in a counter-clockwise sense carrying the mounting head into rotation also, which in turn draws the oscillating arm 8 into rotation and by means of the connecting device 7 moves the wiper blade 2. The tilting web 15 then acts as an intermediate part subjected to a force in accordance with the wiping direction. The force acts solely on the tilting web 15, so that the wiping lip 14 attached to the wiping part 13 is guided in opposite direction to the wiping direction. As already explained above, the oscillatory movement of the wiping lip 14 along the windscreen to be wiped results in a "rattling" noise (that is a so-called "reversal noise"), particularly as a consequence of the wiping lip 14 being tumbled over at each turning point of its oscillatory movement. In order to reduce the noise a noise dampening profile is provided in the slits 16, wherein the noise dampening profile in each slit is formed by spaced-apart protrusions 17 extending outwardly from the tilting web 15. The width of the protrusions 17 extending in a direction transverse to the longitudinal direction of the wiper blade 2 varies along the longitudinal direction, in the sense that the width of the protrusions 17 at the location of the connecting device 7 is larger than the width of the protrusions 17 at the location of the connecting pieces 6. More precisely, with reference to FIG. 2b, the width of the protrusion 17 at the location A (for example, at the ends 5 of the strips 4) is smaller than the width of the protrusion 17 at the location B; the width of the protrusion 17 at the location B is smaller than the width of the protrusion 17 at the location C; the width of the protrusion 17 at the location C is smaller than the width of the protrusion 17 at the location D; the width of the protrusion 17 at the location D is smaller than the width of the protrusion 17 at the location E; the width of the protrusion 17 at the location E is smaller than the width of the protrusion 17 at the location F. In other words, $A<B<C<D<E<F$. Thus, the width of the protrusions 17 decreases along the length of the wiper blade 2, seen from the connecting device 7 to the opposite connecting pieces 6. As seen from FIG. 2b, the protrusions 17 on opposite sides of the tilting web 15 are located in a staggered manner in the slits 16.

FIGS. 3a and 3b correspond to FIGS. 6a and 7a, respectively, with the difference that a corresponding noise dampening profile has been provided in upper slits 18 on opposite sides of an upper tilting web 19. The tilting web 15 and the slits 16 may then be called lower tiling web 15 and lower slits 16, respectively. As can be seen from FIG. 3b at the bottom, this extra noise dampening profile consists of corresponding protrusions 20 extending outwardly from the tilting web 19 on opposite sides thereof in a staggered manner. As far as the width of the protrusions 18 is concerned, again applies $A<B<C<D<E<F$. The width of the protrusions 18 thus again decreases along the length of the wiper blade 2, seen from the connecting device 7 to the opposite connecting pieces 6.

As can be seen in FIG. 4, the width of the protrusions 17, 20 (plotted along the y-axis) may vary along the length of the wiper blade 2 measured along the x-axis in several ways: for example, the width gradually decreases from the location x of the connecting device 7 to the location y of the connecting pieces 6 (see curve 21) or the width varies along curve 22 in the sense that the width at the location x of the connecting device 7 is larger than the width at the location y of the connecting pieces 6, but the width is smallest inbetween.

The invention is not restricted to the embodiments shown, but also extends to other preferred embodiments falling within the scope of the appended claims.

The invention claimed is:

1. A windscreen wiper device comprising an elastic, elongated carrier element, as well as an elongated wiper blade, which can be placed in abutment with a windscreen to be wiped, which wiper blade includes at least one longitudinal groove, in which groove a longitudinal strip of the carrier element is disposed, wherein ends of said longitudinal strip are connected to a respective connecting piece, which windscreen wiper device comprises a connecting device for attachment to an oscillating arm, wherein said wiper blade comprises an elongated upper holding part and an elongated lower wiping part of a flexible material, wherein said holding part holds said longitudinal strip, wherein said wiping part comprises a wiping lip, and wherein said holding part and said wiping part are interconnected by a tilting web, and wherein a noise dampening profile is provided in slits formed between said holding part, said wiping part and said tilting web, and wherein a width of said noise dampening profile extending in a direction transverse to the longitudinal direction of said wiper blade varies along said longitudinal direction, and wherein said width of said noise dampening profile at the location of said connecting device is larger than said width at the location of said connecting pieces for compensating for the variation of the pressure exerted on said wiper blade by the oscillating arm.

2. A windscreen wiper device according to claim 1, wherein said width gradually decreases from the location of said connecting device to the location of said connecting pieces.

3. A windscreen wiper device according to claim 1, wherein said noise dampening profile in each slit is formed by spaced-apart protrusions extending outwardly from said tilting web.

4. A windscreen wiper device according to claim 3, wherein said protrusions extend outwardly from said tilting web to the middle of each slit.

5. A windscreen wiper device according to claim 3, wherein said protrusions on opposite sides of said tilting web are located opposite one another in said slits.

6. A windscreen wiper device according to claim 3, wherein said protrusions on opposite sides of said tilting web are located in a staggered manner in said slits.

7. A windscreen wiper device according to claim 3, wherein the width of said protrusions at the location of said connecting device is chosen within the range of 0.7 mm and 2.2 mm.

8. A windscreen wiper device according to claim 3, wherein the width of said protrusions at the location of said connecting pieces is chosen within the range of 0.1 mm and 1.2 mm.

9. A windscreen wiper device according to claim 1, wherein said tilting web and said noise dampening profile are made in one piece.

10. A windscreen wiper device according to claim 1, wherein said dampening profile is provided in upper slits on opposite sides of an upper tilting web of said wiper blade, as well as in lower slits on opposite sides of a lower tilting web of said wiper blade.

* * * * *